Aug. 18, 1959  J. J. BRIGGS  2,899,957
PROSTHETIC APPLIANCE
Filed Nov. 13, 1957

INVENTOR
J. J. BRIGGS
BY
ATTORNEY

United States Patent Office 2,899,957
Patented Aug. 18, 1959

2,899,957

PROSTHETIC APPLIANCE

John J. Briggs, Indianapolis, Ind.

Application November 13, 1957, Serial No. 696,175

2 Claims. (Cl. 128—79)

This invention relates to human relations including the promotion of peace and harmony between the sexes and particularly within the marital status, as well as to the welfare and happiness of mankind, including the propagation of the species.

The invention also is concerned with the replacement of certain deficiencies in the constitutions of those involved, the relief of stresses and tensions, and otherwise to promote the well-being of the individuals involved and accordingly both the public and the private good.

While discord and dissension which sometimes have resulted in destruction of the home have been attributed to various reasons, I have found from experience that difficulties between husband and wife frequently are because of tensions resulting from unhappiness caused by frayed nerves brought on by failure of one or the other to maintain a calmness notwithstanding a lack of satisfaction.

It is an object of the invention to overcome by the provision of equipment designed to benefit both the male and female, the difficulties, deficiencies, including deficiencies as to size, weaknesses, particularly physiological, stability, or the disparity in the time element on the part of both the male and the female as well as other symptoms leading to irritability and eventually to undesirable consequences.

Another object of the invention is to bridge the chasm between the sexes, particularly husbands and wives suffering from a malevolent lack of mental, spiritual and physical complementation, and to promote the marital relations and the mutual enjoyment of the beautiful of life.

Figure 1:
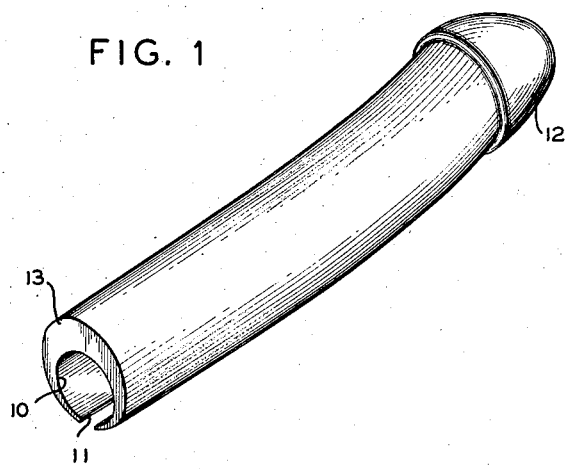
Figure 2:
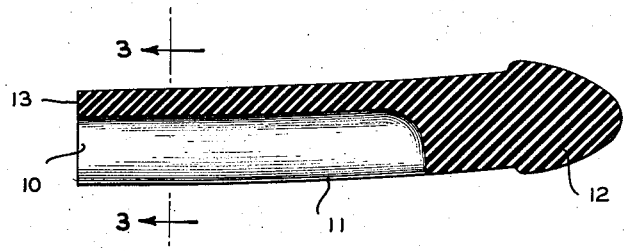

Other objects and advantages of the invention will be apparent from the following description taken in conjunction with the accompanying drawing wherein:

Fig. 1 is a perspective illustrating one application of the invention;

Fig. 2, a longitudinal section; and

Figure 3:

Fig. 3, a transverse section on the line 3—3 of Fig. 2.

Briefly stated, the device of the present invention is an elongated tubular member, having an open base and tapering gradually to an enlarged closed portion at the apex thereof, with a longitudinal split from its open base to a location near its apex, the wall of the member tapering transversely from relatively thin edges at each side of the split to a substantially thick, rigid intermediate portion diametrically opposite to said split. The device is composed of resilient material tending to hold fast when applied and capable of being expanded by separating the adjacent edges to provide for the enlargement of the device and the application of the same. Likewise, portions of the base of the device are readily severable or detachable transversely in order to vary the length of the device as desired.

With continued reference to the drawing the device of the present invention is an elongated tubular member of resilient material having inherent rigidity. It includes an open base 10 with longitudinally disposed relatively thin edges 11 providing a split lengthwise of the member extending to a position near the apex which is provided with a corona or enlargement 12.

Due to the fact that the longitudinal opening 10 is eccentrically disposed relative to the member a relatively thick elongated portion or backbone 13 is provided diametrically opposite the edges 11.

The application and use of the device is thus facilitated, the thinness of the edges allowing them to be moved apart in application and the thickened portion providing the necessary solidity and rigidity required.

Expansion of the device is permitted because of the resiliency of the material of which it is constituted and the greatest dimension of the device may be varied by the severance or detachment of a portion of the same.

The extremity of the device at the base is of maximum transverse dimension and is gradually tapered or reduced from such end to the portion of the device of smaller size.

The use and advantages of the device will be apparent as well as its contribution to the well-being of all concerned.

It will be apparent to those skilled in the art that various changes may be made in the invention without departing from the spirit and scope thereof and therefore the invention is not limited by that which is illustrated in the drawing and described in the specification, but only as indicated in the appended claims.

What is claimed is:

1. An anatomical device comprising an elongated tubular member having a base and an apex, an enlarged solid outer end and an eccentrically disposed opening lengthwise of the same forming a relatively thick portion or backbone along one side and a longitudinal split along the other side, the peripheral wall of said member decreasingly tapering transversely to longitudinal edges at each side of said split, the structure being such that it may be applied by expanding the adjacent edges to increase the transverse size of the longitudinal opening thereof, the base of said member being readily severable transversely of its length in order to provide a device of the desired length, said device being of such proportions composition and resiliency to remain securely in place when applied in a manner to support and supplement.

2. An anatomical appliance comprising an elongated tubular member having inherent rigidity, said member having a base and an apex with an enlarged corona portion at the apex thereof, said member having an eccentrically located longitudinally disposed opening longitudinally split from said base to a location adjacent to its apex, the wall of said member tapering transversely from relatively thin edges at each side of said opening to a substantially thick rigid intermediate portion diametrically opposite to said slit, the structure being such that it may be expanded by separating the adjacent relatively thin edges to provide for the enlargement of the device and the introduction thereon of an anatomical organ, the base of said member being readily severable transversely to provide a device of the desired length, said device being resilient and tending to grip and hold fast to said anatomical organ.

References Cited in the file of this patent

UNITED STATES PATENTS

| 1,362,398 | Crawford et al. | Dec. 14, 1920 |
| 2,633,126 | Newmark | Mar. 31, 1953 |

FOREIGN PATENTS

| 145,821 | Germany | May 25, 1936 |
| 641,684 | Germany | Feb. 10, 1937 |